July 9, 1935.  F. C. BEST  2,007,420
MOTOR VEHICLE
Filed Feb. 17, 1933
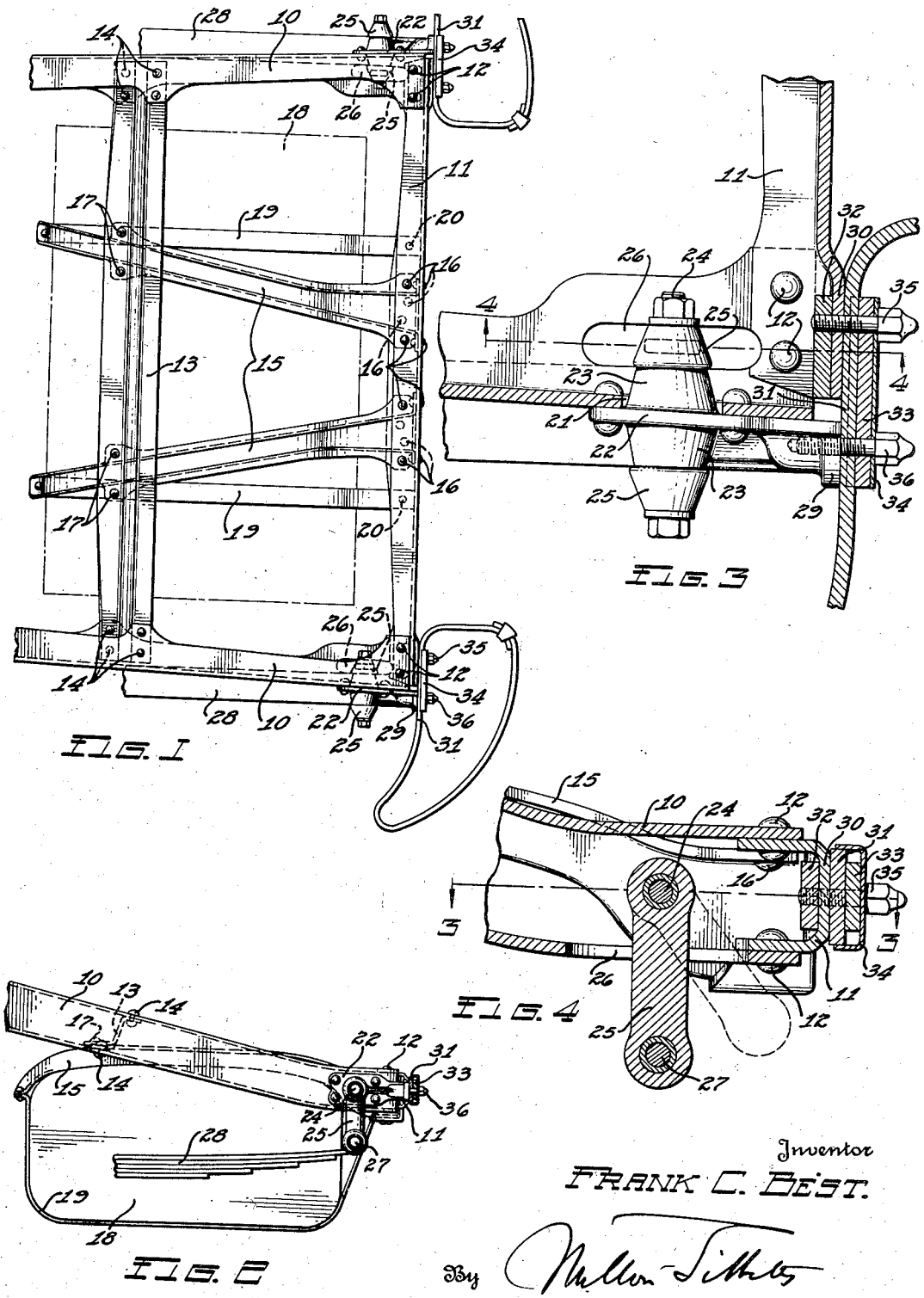
Inventor
FRANK C. BEST.
By [signature]
Attorney Patented July 9, 1935

2,007,420

UNITED STATES PATENT OFFICE 2,007,420

MOTOR VEHICLE

Frank C. Best, Detroit, Mich., assignor to Packard Motor Car Company, Detroit, Mich., a corporation of Michigan Application February 17, 1933, Serial No. 657,231

5 Claims. (Cl. 280—106)

This invention relates to frames for motor vehicles and more particularly to the rear end construction of such frames.

An object of the invention is to provide a lightweight vehicle frame structure in which the rear end is constructed in a new and novel manner eliminating horizontal weaving thereof under all operating conditions.

Another object of the invention is to provide a vehicle frame structure in which rear brace members are utilized to support the gasoline tank forwardly of the rear end of the frame and in a plane therebeneath.

A further object of the invention is to provide a frame structure for vehicles having a novel form of brace means at the rear which serves as a supporting carrier.

Other objects of the invention will appear from the following description taken in connection with the drawing, which forms a part of this specification, and in which:

Fig. 1 is a plan view of the rear end of the motor vehicle frame incorporating my invention;

Fig. 2 is a side elevational view of the same;

Fig. 3 is a sectional view taken on line 3—3 of Fig. 4;

Fig. 4 is a sectional view taken on line 4—4 of Fig. 3;

Referring now to the drawing by characters of reference, longitudinally extending frame members 10 are connected at their rear end by a transverse frame member 11. These members are preferably of channel form with the open side extending inwardly of the frame and the rear transverse member is arranged to telescope partially into the end of the longitudinal members with which it is rigidly fixed by rivets as indicated at 12.

Extending parallel with the rear member 11 and spaced forwardly thereof is a Z-frame member 13 having its ends telescoping into the longitudinal members to which the upper and lower flanges are secured by rivets, as indicated at 14. A pair of brace members 15 extends between the two transverse members and in a direction oblique to the longitudinal center line of the frame. The rear ends of this pair of members fit within the rear transverse frame member and they are secured thereto by rivets, as indicated at 16. The forward ends of the diagonal braces extend beneath and beyond the lower flange of the Z-member and are secured thereagainst by rivets as indicated at 17. The brace members serve to prevent horizontal weaving of the frame due to the reaction of forces thereon being in opposite or opposed directions. These members furthermore assist in serving as a support for the gasoline tank 18. To the forward end of each of the brace members is fixed a strap 19 which extends under the tank and is secured at its rear end to the rear tranverse member by rivets 20. By this means of support, the tank is secured forwardly of the rear transverse member of the frame and also substantially beneath the longitudinal members 10. The interconnection of the members at the rear end of the vehicle frame provides a lightweight rugged construction which will readily withstand the load of the tank and any other load to which it is subjected.

The longitudinally extending members 10 are provided at the rear end with an opening 21 over which is riveted a casting 22 having bearing portions 23 projecting from each side thereof for supporting a pin 24. One of the projections of each casting extends through the adjacent opening in the longitudinal frame member and on each end of the pins is mounted a spring shackle 25. The lower flange of the longitudinally extending member of the frame is provided with an opening as indicated at 26 through which the inner spring shackle section extends. A pin 27 is carried by each pair of spring shackles and a multi-leaf spring 28 is mounted at its rear end on each of the shackle pins 27. Through arranging the spring shackle brackets in this manner, they can be cast instead of forged as usually required when projecting from the rear end of the frame and secured at one end. The advantage of using a casting instead of a forging is extremely advantageous from the standpoint of cost. In addition to this, it will be noted that the supporting pins 24 extend in a horizontal plane through the rear end of the side frame members and thus reduces the frame clearance relative to a structure in which such shackle support is secured beneath the side members of the frame.

These spring brackets 22 are formed with a rearwardly extending portion terminating in a transversely extending flange 29, the rear face of which is designed to be flush with the rear wall of the pressed out ends 30 of the rear transverse frame member. The portions 30 of the transverse frame member and the adjacent flanges 29 provide a supporting means against which the rear rail of a bumper 31 is secured. A reinforcing strip 32 is welded to the front face of each portion 30 of the rear transverse frame member while a strip 33 is arranged over the rear face of the rail of the bumpers. A finishing strip 34 encloses the rear face of each of the strips 33, and the strips 32, 33 and 34 together with the bumper and the portions 30 of the transverse frame member are secured together by bolts 35. Bolts 36 extend through the strips 33 and 34 and secure the rail of the bumpers to the flanges 29. In this manner, the rear bumpers are secured directly to the end member of the frame and to the spring brackets, thus eliminating the necessity of a bumper supporting bracket secured to the rear end of the frame.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. A frame comprising side members, spaced transverse members fixed to the side members, members secured to the transverse members and extending obliquely to the longitudinal center line of the frame and projecting in advance of and downwardly from the forward transverse member, and tank supporting straps secured at their forward ends to the projecting ends of the oblique members and to the rear transverse member.

2. A frame comprising channel shaped side members, a transverse end member fixed to the rear ends of the side members, a Z-shaped transverse member in advance of said end member having its ends projecting into the open sides of the channel side members, means fixing the top and bottom flanges of the Z-member to the top and bottom flanges respectively of the side members overlapping the same, and diagonal members fixed to the end transverse member and to the bottom flange of the Z-member, said members extending obliquely of the longitudinal center line of the frame.

3. A motor vehicle frame comprising longitudinally extending side members, spaced transversely extending rear members fixed to the side members, brace members extending longitudinally of the frame and fixed to the transverse members, a fuel tank, the under side of the brace members being formed similar to the top portion of the tank and straps extending under the tank secured at their forward ends to the brace members and at their rear ends to the rear transverse member, said straps holding the tank against the brace members.

4. A motor vehicle frame comprising side members, spaced transversely extending rear members fixed to the side members, brace members extending longitudinally of the frame and fixed to the transverse members, the forward end of the brace members extending in advance of the forward transverse member, and tank securing straps fixed at their rear ends to the rear transverse member and at their forward ends to the front ends of the brace members.

5. A motor vehicle frame comprising longitudinally extending side members, spaced transversely extending rear members fixed to the side members, brace members extending longitudinally of the frame and fixed to the transverse members, a fuel tank, the under side of the brace members being formed similar to the top portion of the tank, and means for holding said tank against said brace members.

FRANK C. BEST.